United States Patent
Le Merrer et al.

(10) Patent No.: US 7,991,823 B2
(45) Date of Patent: Aug. 2, 2011

(54) METHOD FOR DETERMINING THE DYNAMICS OF A LOGICAL NETWORK

(75) Inventors: Erwan Le Merrer, Tregastel (FR); Didier Neveux, Cavan (FR); Anne-Marie Kermarrec, Rennes (FR)

(73) Assignee: France Telecom, Paris (FR)

( * ) Notice: Subject to any disclaimer, the term of this patent is extended or adjusted under 35 U.S.C. 154(b) by 479 days.

(21) Appl. No.: 12/148,159

(22) Filed: Apr. 16, 2008

(65) Prior Publication Data
US 2008/0320133 A1    Dec. 25, 2008

(30) Foreign Application Priority Data

Apr. 16, 2007  (FR) ..................................... 07 54499

(51) Int. Cl.
*G06F 15/16* (2006.01)
*G06F 15/177* (2006.01)
(52) U.S. Cl. ........................ 709/201; 709/220
(58) Field of Classification Search ................. 709/201, 709/202, 213, 214, 223, 224, 230, 248
See application file for complete search history.

(56) References Cited

U.S. PATENT DOCUMENTS

| | | | | |
|---|---|---|---|---|
| 5,535,195 | A * | 7/1996 | Lee ............................... | 370/256 |
| 6,980,518 | B1 * | 12/2005 | Sun et al. ...................... | 370/235 |
| 7,120,681 | B2 * | 10/2006 | Frelechoux et al. .......... | 709/221 |
| 7,693,120 | B2 * | 4/2010 | El-Damhougy ............... | 370/338 |
| 7,730,207 | B2 * | 6/2010 | Zhang et al. .................. | 709/242 |
| 2007/0253341 | A1 * | 11/2007 | Atkinson et al. .............. | 370/252 |
| 2008/0104218 | A1 * | 5/2008 | Liang et al. .................... | 709/223 |
| 2008/0107089 | A1 * | 5/2008 | Larsson et al. ................. | 370/338 |
| 2008/0273544 | A1 * | 11/2008 | Frelechoux et al. ........... | 370/408 |
| 2010/0030909 | A1 * | 2/2010 | Magharei et al. ............. | 709/231 |

FOREIGN PATENT DOCUMENTS

FR    2 881 305    7/2006
WO   WO 2005/064850    7/2005

OTHER PUBLICATIONS

D. Stutzbach and R. Rejaie, "Characterizing Churn in Peer-to-Peer Networks," University of Oregon, Eugene, OR, Tech. Rep. CIS-TR-2005-03, May 2005.*
D. Stutzbach and R. Rejaie. Understanding churn in peer-to-peer networks. In Proc. Internet Measurement Conference (IMC), Oct. 2006.* Zhijun Wang; Kumar, M.; Das, S.K.; Huaping Shen; , "File Consistency Maintenance Through Virtual Servers in P2P Systems," Computers and Communications, 2006. ISCC '06. Proceedings. 11th IEEE Symposium on , vol., No., pp. 435-441, Jun. 26-29, 2006.*
Jelasity, M., Montresor, A., and Babaoglu, O. 2005. Gossip-based aggregation in large dynamic networks. ACM Transactions on Computer Systems 23, 2 (May).*

* cited by examiner

*Primary Examiner* — Thu Nguyen
*Assistant Examiner* — Julian Chang
(74) *Attorney, Agent, or Firm* — Cohen Pontani Lieberman & Pavane LLP

(57) ABSTRACT

A method for determining the dynamics of a logical network, said network comprising a plurality of communication nodes (21, 24, 26, i, k). The method comprises obtaining (31), in a node (21) of the network, of at least one item of information (Li, Jk) relating to a modification of the neighborhood of said node, in the course of a predetermined period. The method also comprises determining (33), in said node of the network, of a local dynamics corresponding to at least one sum $$\left( \sum_i L'i, \sum_k J'k \right)$$

of at least part of the information obtained.

12 Claims, 4 Drawing Sheets

METHOD FOR DETERMINING THE DYNAMICS OF A LOGICAL NETWORK

RELATED APPLICATION

This application claims the priority of French application No. 07/54499 filed Apr. 16, 2007, the entire content of which is hereby incorporated by reference.

FIELD OF THE INVENTION

The present invention pertains to the field of determining the dynamics of a logical network comprising a plurality of communication nodes. More particularly, the invention relates to the determining of the dynamics of a network of peer-to-peer type.

BACKGROUND OF THE INVENTION

A logical network or "overlay network" is a communication network constructed on another underlying network, for example a physical network. The nodes of the logical network are linked by logical connections. Each of these connections corresponds to a path consisting potentially of several physical connections linking the machines of the underlying physical network. A logical network is constructed with the aid of a specific application or software. For example in a logical network of peer-to-peer type, the network is constructed on the basis of the peer-to-peer application executed on each of the nodes of said network.

A peer-to-peer network possesses a dynamics in that nodes enter and nodes exit this network regularly. Determining the dynamics of a peer-to-peer network then consists in determining the number of nodes entering the network and/or the number of nodes exiting this network, in the course of a predetermined period.

Determining the dynamics is beneficial to an operator for performing operations for monitoring a peer-to-peer network which the operator trusts for managing certain services, for example a data storage service. Determination of the dynamics of this network allows the operator to adapt the working of the nodes of said network. This makes it possible to maintain the service quality that must be ensured by the operator via the peer-to-peer network.

The determination of the dynamics of a network of peer-to-peer type is currently based on obtaining information that is centralized at the level of a server. This server dispatches messages, for example a connection request, to the nodes of the network that it ascertains as executing the peer-to-peer application. If the connection request fails, the server then obtains the item of information that the node has left the peer-to-peer network. This item of information is thereafter processed by the server so as to determine the number of nodes that have left the network in the course of the message dispatch period.

Although this procedure makes it possible to determine whether a node is still present at a given instant, it does not guarantee this presence throughout the message dispatch period. Dispatching the connection requests to the whole set of nodes of the network takes time. This is all the more true if the network comprises a large number of nodes. Thus a node which has responded favourably to the connection request at the start of the message dispatch period, is no longer necessarily present in this network at the end of this period. The determination of the number of nodes having left the network in the course of this dispatch period will therefore be erroneous.

To reduce this message dispatch period, it is possible to limit the number of nodes to be invoked and to extrapolate the results to the peer-to-peer network as a whole. However, the group of nodes chosen to be invoked by the server does not necessarily represent the dynamics of the peer-to-peer network as a whole.

SUMMARY OF THE INVENTION

One aspect of the present invention is directed to a method for determining the dynamics of a logical network, said network comprising a plurality of communication nodes, said method comprising an obtaining, in a node of the network, of at least one item of information relating to a modification of the neighbourhood of said node, in the course of a predetermined period. The method also comprises a determining, in said node of the network, of a local dynamics corresponding to at least one sum of at least part of the information obtained.

Thus, by monitoring a determined part of the network, that is to say the neighbourhood of a node, it is possible to rapidly determine an accurate local dynamics of this part of the network. The determination of the dynamics of the network on the basis of the knowledge of this local dynamics will be more accurate.

According to nonlimiting preferential embodiments, the method which is the subject of the invention exhibits the additional characteristics taken in isolation or in combination, stated hereinafter:

An item of information obtained is an item of information relating to the departure of another node from the neighbourhood of said node.

Thus, it is possible to determine a local dynamics corresponding to the number of nodes leaving the neighbourhood of a node.

An item of information obtained is an item of information relating to the arrival of another node in the neighbourhood of said node.

Thus, it is possible to determine a local dynamics corresponding to the number of nodes arriving in the neighbourhood of a node.

At least part of the information obtained is weighted as a function of the connectivity of the other node associated with each item of information obtained, and in that the local dynamics determined is at least the sum of at least part of the weighted information obtained.

Thus, if a node leaves or arrives in the logical network, its departure or its arrival will be reckoned only once at the network level.

A local dynamics is determined in various nodes of the network.

Thus, it is possible to monitor various parts of the communication network, or indeed the network as a whole.

The local dynamics determined in said node is combined with at least one other local dynamics determined in a neighbour node of said node, so as to determine in said node a new local dynamics making it possible to calculate the dynamics of the logical network.

Thus, by exchanging the local dynamics between the neighbour nodes, each node determines a new local dynamics. On completion of these various exchanges and combinations, each node will converge towards a determination of a uniform local dynamics. This local dynamics will be uniform over the network as a whole.

Another aspect of the invention relates to a device for determining the dynamics of a communication network. The said device comprises means for obtaining in a node of the network at least one item of information relating to a modification of the neighbourhood of said node, in the course of a predetermined period. The device also comprises means for determining, in said node of the network, a local dynamics corresponding to at least one sum of at least part of the information obtained.

A third aspect of the invention relates to a computer program on an information medium, said program comprising instructions adapted for the implementation of the method according to the first subject, when said program is loaded and executed in a computer-based system.

A fourth aspect of the invention relates to a method for managing a node belonging to communication network of peer-to-peer type. The said method comprises an obtaining in the node of the network of at least one item of information relating to a modification of the neighbourhood of said node by another node, in the course of a predetermined period. The method comprises a weighting of at least part of the information obtained as a function of the connectivity of the other node associated with each item of information obtained. The method also comprises a determining, in said node of the network, of a local dynamics corresponding to at least one sum of at least part of the weighted information obtained. The method furthermore comprises a combining of the local dynamics with at least one other local dynamics determined in a neighbour node of said node, so as to determine in said node a new local dynamics making it possible to calculate the dynamics of the logical network. The method finally comprises an adapting of at least one of the management parameters of said node as a function of the new calculated local dynamics.

According to nonlimiting preferential embodiments, the method which is the fourth subject of the invention exhibits the additional characteristics taken in isolation or in combination, stated hereinafter:

A management parameter of said node is the replication rate of the data stored on said node.

A fifth subject of the invention relates to a computer program on an information medium, said program comprising instructions adapted for the implementation of a method according to the fourth subject of the invention when said program is loaded and executed in a computer-based system.

DETAILED DESCRIPTION OF THE DRAWINGS

Although the following description relates in particular to determining the dynamics of a logical network of peer-to-peer type, the invention also applies in respect of other types of logical network such as sensor networks, ad-hoc networks, or Grids.

Figure 1:
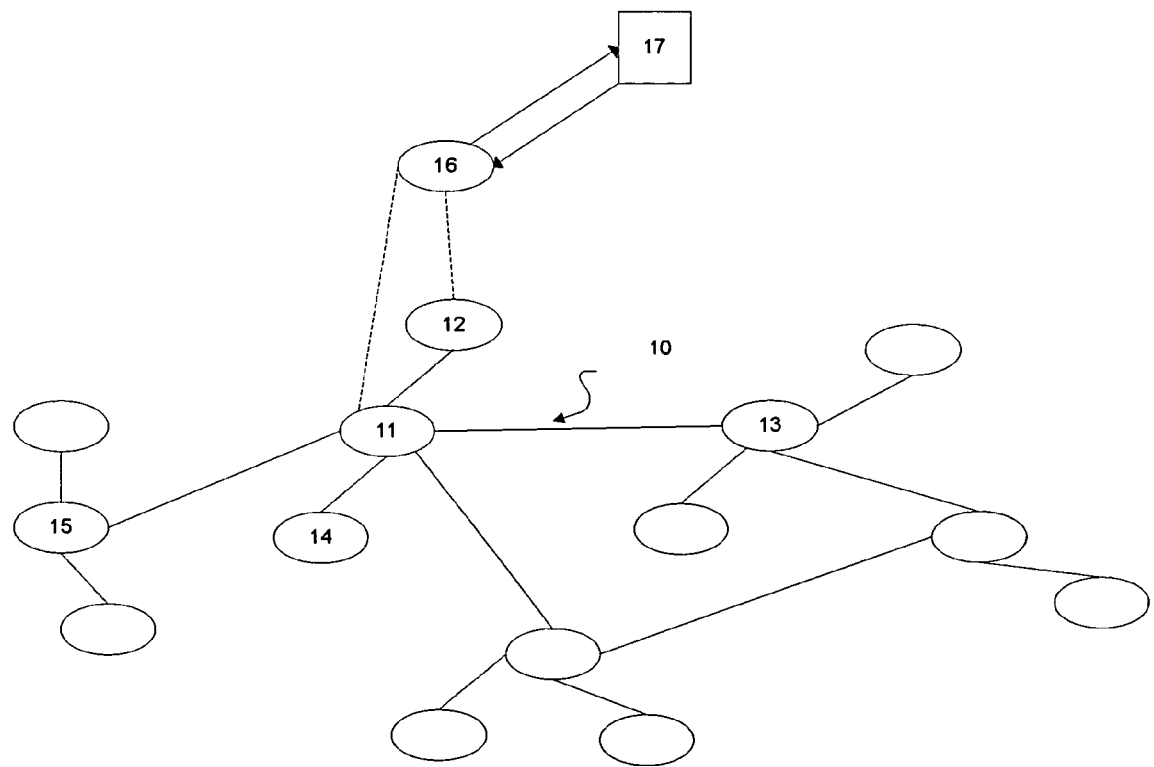
FIG. 1 shows a logical network of peer-to-peer type according to an embodiment of the invention.

FIG. 1 presents a network of peer-to-peer type.

A network of peer-to-peer type is a network in which each node plays at one and the same time the role of server and customer. This type of network does not require the use of a dedicated centralized server to perform tasks that a node must carry out.

The expression node of the network is understood to mean any type of terminal, such as for example a computer, or a wireless telephone.

These nodes are connected, that is to say they exchange data packets between themselves, for example on the state of the network. Specifically, a network of peer-to-peer type is by nature dynamic. The nodes connect up and frequently disconnect from the network, doing so independently of one another. It is then necessary that the nodes, forming the network, mutually inform themselves of these changes by exchanging these data packets.

A node 11 of the communication network possesses direct connections with other nodes 12, 13, 14, 15 of the network. These other nodes then constitute its neighbours. The neighbourhood of a node then consists of the whole set of neighbour nodes of said node. The direct connections between the node 10 and its neighbours allow the node 10 to exchange data packets with its neighbours 12, 13, 14, 15 in a single hop. These data are, for example, audio data and/or video data.

The expression direct connection is understood to mean a virtual circuit established between two nodes allowing the exchange of data packets between these two nodes. This virtual circuit uses various protocols to trunk these data packets. The connection uses, for example, a transport protocol such as TCP "Transmission Control Protocol". As a variant, the connection uses the UDP "User Datagram Protocol" transport protocol or any other protocol.

It will be noted that the number of neighbours per node is determined as a function of the resources of each node. There is thus no need for the nodes 10 to maintain resource-expensive multiple connections. The number of neighbour nodes for a given node is for example O (log N) where N represents the size of the network. It will be noted that the neighbours 12, 13, 14, 15 are chosen in an appropriate manner to allow the node 10 to communicate with any node of the peer-to-peer network in n hops.

It will also be noted that the topologies of a network of peer-to-peer type are variable. FIG. 1 presents a topology in which the nodes are in one and the same hierarchical level. As a variant, the topology of the network is of hybrid type. In this topology, super peers, elected from among the nodes, play the role of servers in relation to the other nodes.

It will be noted, furthermore, that when a new node 16 seeks to join the peer-to-peer network, it has the possibility of downloading from a server 17 all or part of the peer-to-peer software. This peer-to-peer software contains, for example, a list of addresses of nodes already present in the network. This list allows the new node 16 in the network to create direct connections with its new neighbours 11, 12.

It will be noted finally, that the server 17 is not a node of the network.

Figure 2:
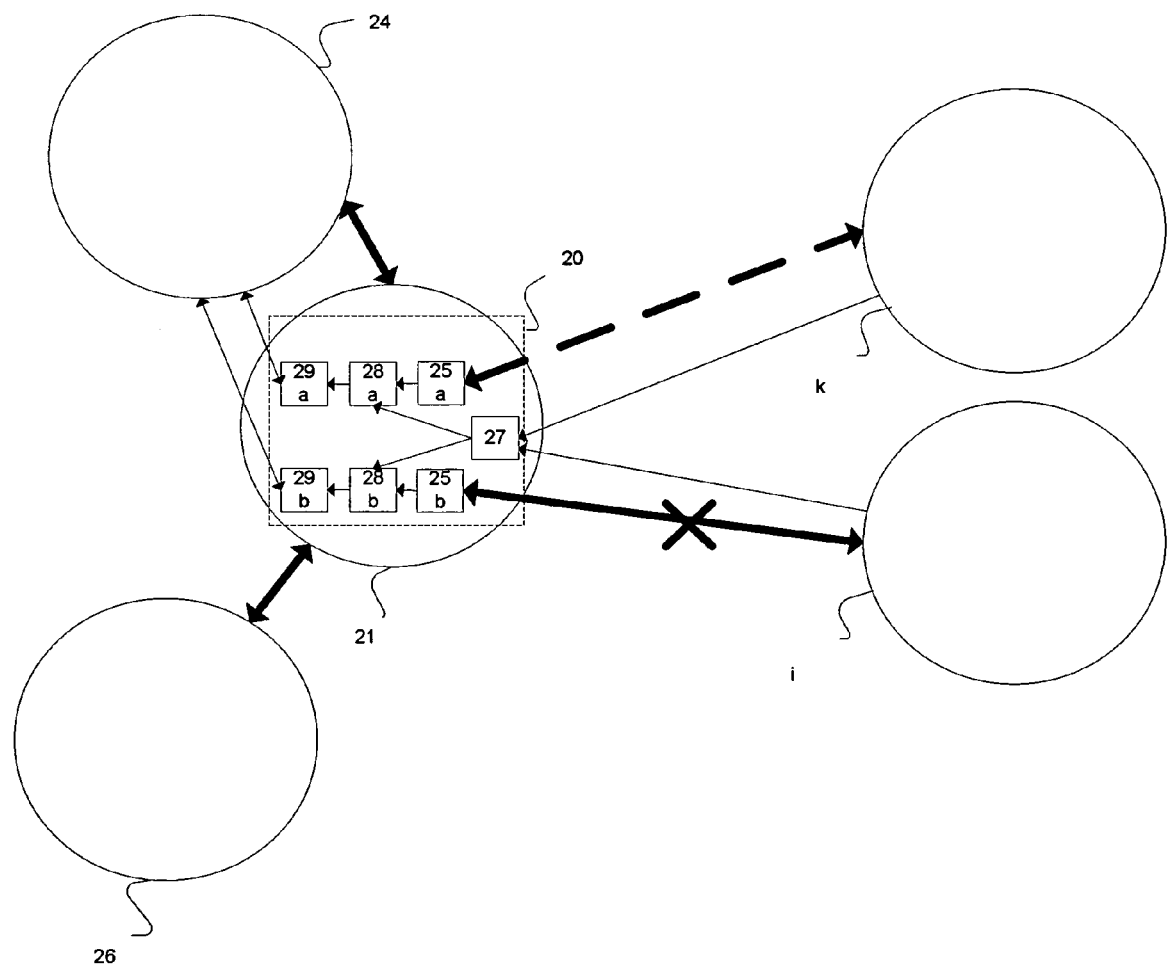
FIG. 2 shows a device for determining the dynamics of a logical network, according to an embodiment of the invention.

FIG. 2 presents a device 20 for determining the dynamics of a logical network 10 of peer-to-peer type.

The device 20 is present in a node 21 of the network. This device 20 thus comprises means for obtaining at least one item of information. This item of information relates to a modification of the neighbourhood of said node 21. The neighbourhood of node 21 consists of the nodes i, k, 24, 26.

The means for obtaining an item of information comprise, for example, means $25a$ for obtaining at least one item of information Li. This item of information Li relates to the departure of another node i from the neighbourhood of said node 21. Thus Li=1, when a node i that is a neighbour of node 21 loses its direct connection with node 21. The expression departure of node i from the neighbourhood of node 21 is understood to mean that node i abruptly leaves this neighbourhood without having had the possibility of informing node 21 thereof. The means 25*a* obtain, for example, the item of information regarding a loss of connection in that node 21 no longer receives data packets from node i.

As a variant, the means for obtaining at least one item of information comprise means 25*b* for obtaining at least one item of information Jk. This item of information Jk relates to the arrival of another node k in the neighbourhood of node 21. Thus Jk=1, when the other node k arrives in the neighbourhood of node 21. Node k arrives in the neighbourhood of node 21 in that a direct connection is created between node k and node 21. The obtaining means 25*b* obtain an item of information relating to the creation of a direct connection, by way of node k which informs node 21 of its arrival during the creation of said connection.

In another variant, the means for obtaining at least one item of information comprise means 25*a* and means 25*b*.

The means for obtaining at least one item of information 25*a*, 25*b* are associated with means 29*a*, 29*b* for determining a local dynamics.

The local dynamics represents the number of nodes leaving the neighbourhood of node 21 as well as the logical network 20. Thus, the departure of a neighbour from the neighbourhood of node 21 due to a simple reorganization of the connections in the network is not reckoned when determining the dynamics of the network 10. Specifically, this node does not leave the network 10.

The local dynamics then corresponding to a sum of at least part of the information obtained, that is to say to the sum of the information Li dealing solely with the departure of other nodes i from the neighbourhood of node 21 and the network 10. This local dynamics then amounts to calculating the sum $$\sum_i Li,$$

where i represents the neighbour nodes of node 21 having left the neighbourhood of node 21 as well as the network 10 in the course of the predetermined period.

As a variant, the local dynamics represents the number of nodes arriving in the neighbourhood of node 21 and in the network 10. These nodes are also new in the network 10. The local dynamics then corresponding to a sum of at least part of the information obtained, that is to say to the sum of the information Jk dealing solely with the arrival of other nodes k in the neighbourhood of node 21 and in the network 10. Thus, the arrival of a neighbour in the neighbourhood of node 21 due to a simple reorganization of the connections in the network is not reckoned when determining the dynamics of the network 10. It is the other node arriving in the neighbourhood of node 21 which is in a position to forewarn by exchanges of appropriate data packets whether or not the modification of the neighbourhood is due to a reorganization of the network. The local dynamics then amounts to calculating the sum $\sum_k Jk$, where k represents the neighbour nodes of node 21 arriving in the network 10 in the course of the predetermined period.

In another variant, the local dynamics represents the number of other nodes leaving the neighbourhood of node 21 and the network 10 and the number of other nodes arriving in the neighbourhood of node 21 and in the network 10. Determining the local dynamics then amounts to summing on the one hand the whole set of information obtained dealing with the departure of other nodes from the neighbourhood of node 21 and the network 10. This amounts to calculating the sum $$\sum_i Li.$$

Determining the local dynamics also amounts to summing, on the other hand, the whole set of information obtained dealing with the arrival of other nodes in the neighbourhood of node 21 and the network 10. This amounts to calculating the sum $$\sum_k Jk.$$

Thus by monitoring a determined part of the network, that is to say the neighbourhood of a node, it is possible to rapidly determine an accurate local dynamics of this part of the network. The determination of the dynamics of the network on the basis of the knowledge of this local dynamics will be more accurate.

It is possible to determine the dynamics of the logical network by extrapolating this local dynamics. This extrapolation relies on the fact of particular properties of the network. For example, it is possible to consider that each node has the same probability of having another neighbour node in its neighbourhood in the course of a predetermined period. By ascertaining this probability as well as the local dynamics at the level of a node, it is possible to extrapolate a dynamics to the network level.

In a variant embodiment, it is possible to obtain the dynamics of the logical network 10 in a different manner. For this purpose, the means for obtaining at least one item of information 25*a*, 25*b* are associated with means 28*a*, 28*b* for weighting at least part of the information Li, Jk. The information is weighted as a function of the number of connections or connectivity C possessed by each other node i, k, during the modification of the neighbourhood of said node 21 by said other nodes i, k. This connectivity C is collected by means 27 for collecting the connectivity of the neighbour nodes of node 21.

The weighting means thus comprise weighting means 28*a* for constructing a weighted item of information obtained L'i=Li/Ci. This item of information relates, for example, to the loss of a direct connection between node 21 and another node i leaving the neighborhood of node 21 and leaving the network 10. Thus if node i is connected to 10 nodes just before abruptly leaving the network, then L'i=1/10.

The weighting means also comprise weighting means 28*b* for constructing a weighted item of information obtained J'=Jk/Ck. This item of information relates, for example, to the creation of a direct connection between node 21 and another node, for example node k arriving in the neighbourhood of node 21 and in the network 10. Thus if node k chooses node 21, so as to connect on its arrival in the network, then J'k=1/1. Node k thereafter connects to other neighbour nodes. However these connections are not reckoned when determining the dynamics of the network 10. Specifically, these connections correspond to a reorganization of the connections in the network.

The determining means 19a, 19b, determine the local dynamics on the basis of this weighted obtained information. This local dynamics thus corresponding either on the one hand to the sum $$\sum_i L'i$$

of the weighted information Li relating solely to the departure of other nodes i from the neighbourhood of node 21 and the network 10. Or this dynamics corresponds on the other hand to the sum $$\sum_k J'k$$

of the weighted information Lk relating solely to the arrival of other nodes k in the neighbourhood of node 21 and in the network 10. The local dynamics can also correspond to both sums.

It will be noted that in the latter case it is possible to compare both sums to ascertain the evolution of the size of the network at the local level.

It will also be noted that it is possible to determine a local dynamics in various nodes of the network. Thus, it is conceivable to monitor various parts of the communication network, or indeed the network as a whole.

The means 19a, 19b for determining the local dynamics are thereafter in a position to exchange this local dynamics with the neighbour nodes 24, 26 of node 21. These determining means 19a, 19b are capable also of combining the local dynamics with at least one other local dynamics DL adapted so as to constitute a new local dynamics. This other local dynamics DL is determined then exchanged, for example, in a neighbour node 24, 26 of node 21. This other dynamics DL represents the number of nodes leaving the network and/or the number of nodes arriving in the network in the neighbourhood of the neighbour node 24, 26.

Figure 3:
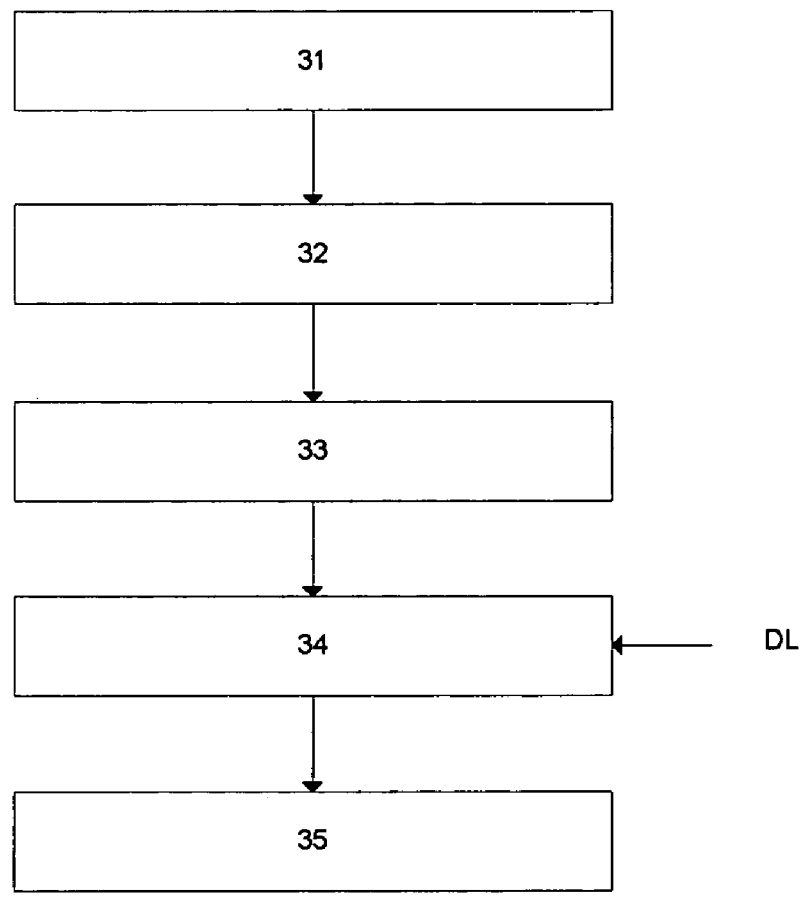
FIG. 3 shows a method for determining the dynamics of a logical network, according to an embodiment of the invention.

FIG. 3 presents a method for determining the dynamics of a communication network.

This method comprises a step 31 of obtaining, in a node 21, at least one item of information relating to a modification of the neighbourhood of said node 21. This obtaining step takes place in the course of a predetermined period. This period is, for example, of the order of a few tens of seconds to a few minutes.

The item of information obtained is an item of information Li relating to the departure of another node i from the neighbourhood of node 21.

As a variant, the item of information obtained is an item of information Jk relating to the arrival of another node k in the neighbourhood of node 21.

The method also comprises a step 32 of weighting at least part of the information obtained. This weighting is performed as a function of the number of connections or connectivity C possessed by the other node i, k, during the modification of the neighbourhood of node 21 by the other node i, k. The weighted item of information obtained is then L'i=Li/Ci in the case of the departure of the other node i. The weighted item of information obtained is J'k=Jk/Ck in the case of the arrival of the other node k. Thus, if a node leaves or arrives in the network, its departure or its arrival will be reckoned only once at the level of the network as a whole. The information selected to be weighted is the information Li relating to nodes i leaving the neighbourhood of node 21 and leaving the network 10. As variants, the information selected to be weighted is the information Lk relating to nodes k arriving in the neighbourhood of node 21 and arriving in the network 10. In another variant, the information selected is both these types of information.

The method furthermore comprises a step 33 of determining, in node 21, a local dynamics corresponding to at least one sum of at least part of the weighted information obtained.

This local dynamics therefore corresponding either to the sum $$\sum_i L'i,$$

of the weighted information Li relating solely to the departure of other nodes i from the neighbourhood of node 21 and the network 10. Or this dynamics corresponds on the other hand to the sum $$\sum_k J'k$$

of the weighted information Lk relating solely to the arrival of other nodes k in the neighbourhood of node 21 and in the network 10. The local dynamics can also correspond to both sums.

Thus by monitoring the modifications of the connections between a node and its neighbours, it is possible to determine an accurate local dynamics of the network part situated in the neighbourhood of said node. The determination of the dynamics of the network on the basis of the knowledge of this local dynamics will be more accurate.

The method for determining the dynamics of a communication network also comprises a step 34 of combining the local dynamics determined in node 21 with at least one other local dynamics DL determined in a neighbour node of said node 21. This combining is, for example, the calculation of the mean between the local dynamics and the other local dynamics DL so as to calculate a new local dynamics more representative of the dynamics of the network as a whole. Of course, this combining is carried out between adapted local dynamics. Thus this combining is carried out between sums representing a value relating to the departure of another node from the neighbourhood of node 21 or sums representing a value relating to the arrival of another node in the neighbourhood of node 21.

It will be noted that step 34 can be carried out for example by using the aggregation procedure based on the Gossip protocol for the exchanging of the local dynamics between the nodes. This procedure uses notably a push-pull scheme for the recovery by a node 21 of the local dynamics of a neighbour node 24. For more information on this procedure, it is possible to consult the document "Gossip-based aggregation in large dynamic networks" by Jelasity et Al published in ACM trans. Comput. Syst., 23(3):219-252, August 2005.

It will be noted finally that at the level of node 21, a new local dynamics is calculated with each of the neighbour nodes of said node. Furthermore, it is possible to have an exchange of local dynamics several times with one and the same neighbour node. Specifically, each neighbour node also calculates a new local dynamics with its own neighbours. It is therefore necessary to share this new value with node 21. A new local dynamics is calculated at the level of node 21 so long as the local dynamics is not evened out over the whole set of nodes of the peer-to-peer network. The evened-out local dynamics then corresponds to the local dynamics per node per predetermined time unit.

The local dynamics per node per time unit is thereafter utilized in step 35. This step 35 multiplies this local dynamics with the total number of nodes belonging to the peer-to-peer network to determine the dynamics of said network 10.

The steps of the method for determining the dynamics of a communication network are determined by the instructions of a computer program used in a node of the network. This step makes it possible to determine the number of nodes arriving in the network and the number of nodes leaving the network in the course of the predetermined period. It is thus possible to determine the global evolution of the size of the network in the course of this same period.

The method is then implemented when the aforesaid program is loaded in a computer-based system incorporated in the node, and whose operation is then controlled by the execution of said program.

This computer program is stored on an information medium. Such an information medium consists of any entity or device capable of storing a program.

For example, the medium in question comprises a hardware storage means, such as a ROM, for example a CD ROM or a microelectronic circuit ROM, or else a magnetic recording means, for example a hard disk. As a variant, the information medium is an integrated circuit within which the program is incorporated, the circuit being adapted to execute or to be used in the execution of the method in question.

Moreover, the information medium is a transmissible immaterial medium, such as an electrical or optical signal trunked via an electrical or optical cable, by radio or by other means.

The program is in particular downloadable on a network of Internet type employing, for example, the server 17.

Figure 4:
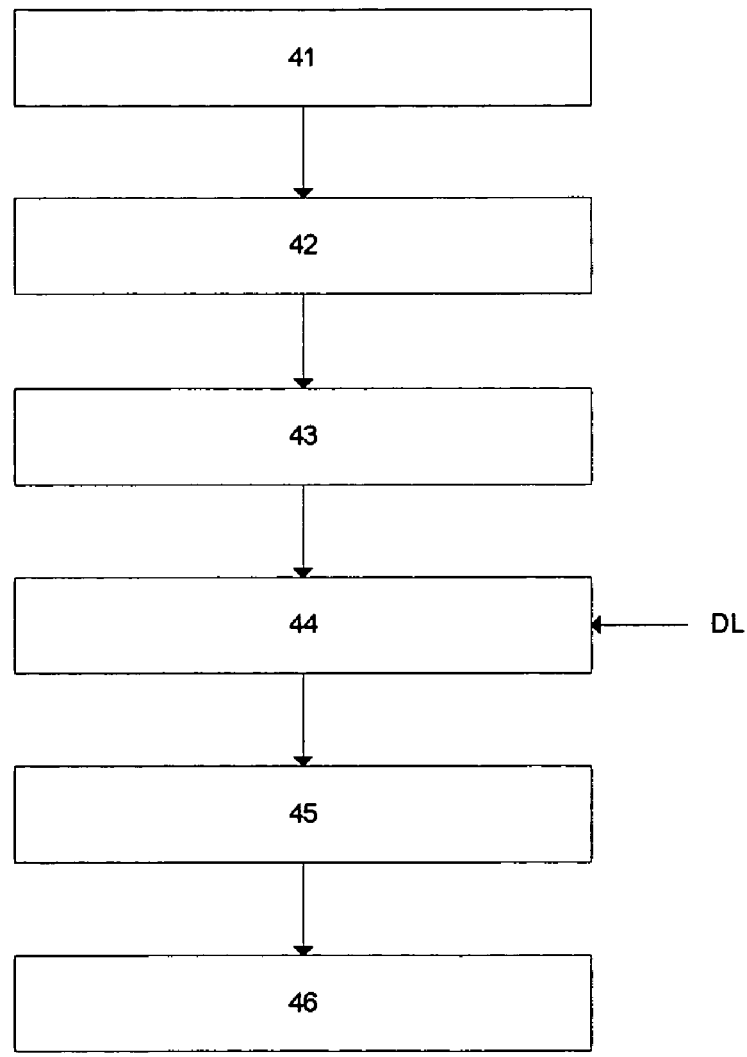
FIG. 4 shows a method for managing a node belonging to a logical network, according to an embodiment of the invention.

FIG. 4 presents a method for managing a node belonging to a communication network of peer-to-peer type.

This method comprises a step 41 of obtaining, in a node 21, at least one item of information relating to a modification of the neighbourhood of said node 21 by another node i, k. This obtaining step takes place in the course of a predetermined period.

The method also comprises a step 42 of weighting at least part of the information obtained as a function of the number of the connectivity of the other node associated with each item of information.

Thus, if a node leaves or arrives in the network, its departure or its arrival will be reckoned only once at the network 10 level.

A step 43 relates to a determining, in node 21 of the network, of a local dynamics corresponding to at least the sum of at least part of the weighted information obtained.

It will be noted that in the course of the determining step, it is possible that another step of obtaining at least one item of information relating to a modification of a direct connection is performed in parallel.

The method also comprises a combining 44 of the local dynamics with at least one other local dynamics DL determined in a neighbour node of node 21, so as to determine in said node a new local dynamics making it possible to calculate the dynamics of the logical network 10 in the course of the predetermined period. The calculation of this new local dynamics is performed so long as the local dynamics is not evened out over the whole set of nodes of the network. The evened-out local dynamics then corresponds to the local dynamics per node per predetermined time unit. This local dynamics per node per predetermined time unit makes it possible to determine the dynamics of the logical network 10.

A step 45 makes it possible to determine the dynamics of the logical network 10 on the basis of the local dynamics per node per time unit.

A step 46 adapts at least one of the management parameters of node 21 as a function of the calculated dynamics of the logical network. As a variant, one of the management parameters of node 21 is adapted as a function of the local dynamics per node per predetermined time unit.

One of the management parameters is, for example, the replication rate of the data stored on node 21. This replication generates exchanges of data packets between the nodes of the network. The auto-adaptation of the replication rate then makes it possible to optimize the number of copies to be made to ensure that the data stored on a node of the network 10 is long-lasting. It is thus possible to economize on bandwidth between the nodes. This makes it possible also to avoid needlessly replicating data if the network is stable.

As a variant, one of the management parameters is the number of neighbours of node 21. By knowing the dynamics of the network and notably the number of nodes exiting the network, node 21 adapts its number of neighbours. Node 21 is thus guaranteed to have a minimum number of neighbours at any instant, even in the event of numerous departures of nodes from the network 10.

This method for managing a node belonging to a communication network of peer-to-peer type is implemented by a program. The said program, present on an information medium, comprises instructions adapted for the implementation of the method when it is loaded and executed in a computer-based system.

This program is in particular downloadable on a network of Internet type employing, for example, the server 17.

The invention claimed is:

1. A method for determining the dynamics of a logical network, said network comprising a plurality of communication nodes, said method comprising:
    obtaining, in a node of the network, at least one item of information relating to a modification of the neighbourhood of said node, in the course of a predetermined period; and
    determining, in said node of the network, a local dynamics corresponding to at least one sum of at least part of the information obtained,
    wherein the at least one item of information obtained includes an item of information relating to the departure of another node from the neighbourhood of said node, and
    wherein at least part of the information obtained is weighted as a function of the connectivity of the other node associated with each item of information obtained, and the local dynamics determined is at least the sum of at least part of the weighted information obtained.

2. The method for determining according to claim 1, wherein the at least one item of information obtained includes an item of information relating to the arrival of another node in the neighbourhood of said node.

3. The method for determining according to claim 1, wherein a local dynamics is determined in various nodes of the network.

4. The method for determining according to claim 1, wherein the local dynamics determined in said node is combined with at least one other local dynamics determined in a neighbour node of said node to determine in said node a new local dynamics.

5. A device for determining the dynamics of a logical network, said network comprising a plurality of communication nodes, said device comprising:
   an obtaining unit, in a node of the network, configured to obtain at least one item of information relating to a modification of the neighbourhood of said node, in the course of a predetermined period; and
   a determining unit, in said node of the network, configured to obtain a local dynamics corresponding to at least one sum of at least part of the information obtained,
   wherein the at least one item of information obtained includes an item of information relating to the departure of another node from the neighbourhood of said node, and
   wherein at least part of the information obtained is weighted as a function of the connectivity of the other node associated with each item of information obtained, and the local dynamics determined is at least the sum of at least part of the weighted information obtained.

6. A non-transitory computer readable medium storing a computer program comprising instructions adapted for the implementation of a method according to claim 1 when said program is loaded and executed in a computer-based system.

7. A method of managing a communication node belonging to logical network, said method comprising the steps of:
   obtaining, in a node of the network, of at least one item of information relating to a modification of the neighbourhood of said node by another node, in the course of a predetermined period;
   weighting at least part of the information obtained as a function of the connectivity of the other node associated with each item of information obtained;
   determining, in said node of the network, a local dynamics corresponding to at least one sum of at least part of the weighted information obtained;
   combining the local dynamics with at least one other local dynamics determined in a neighbour node of said node to determine in said node a new local dynamics; and
   adapting at least one management parameter of said node as a function of a dynamics of the logical network in the course of the predetermined period.

8. The method according to claim 7, wherein the at least one management parameter of said node includes the replication rate of the data stored in said node.

9. A non-transitory computer readable medium storing a computer program comprising instructions adapted for the implementation of a method according to claim 7 when said program is loaded and executed in a computer-based system.

10. A method for determining the dynamics of a logical network, said network comprising a plurality of communication nodes, said method comprising:
    obtaining, in a node of the network, at least one item of information relating to a modification of the neighbourhood of said node, in the course of a predetermined period; and
    determining, in said node of the network, a local dynamics corresponding to at least one sum of at least part of the information obtained,
    wherein the at least one item of information obtained includes an item of information relating to the arrival of another node in the neighbourhood of said node, and
    wherein at least part of the information obtained is weighted as a function of the connectivity of the other node associated with each item of information obtained, and the local dynamics determined is at least the sum of at least part of the weighted information obtained.

11. A device for determining the dynamics of a logical network, said network comprising a plurality of communication nodes, said device comprising:
    an obtaining unit, in a node of the network, configured to obtain at least one item of information relating to a modification of the neighbourhood of said node, in the course of a predetermined period; and
    a determining unit, in said node of the network, configured to obtain a local dynamics corresponding to at least one sum of at least part of the information obtained,
    wherein the at least one item of information obtained includes an item of information relating to the arrival of another node in the neighbourhood of said node, and
    wherein at least part of the information obtained is weighted as a function of the connectivity of the other node associated with each item of information obtained, and the local dynamics determined is at least the sum of at least part of the weighted information obtained.

12. The device for determining according to claim 11, wherein the at least one item of information obtained includes an item of information relating to the departure of another node from the neighbourhood of said node.

* * * * *